United States Patent
Danilov et al.

(10) Patent No.: US 11,334,521 B2
(45) Date of Patent: May 17, 2022

(54) SYSTEM AND METHOD THAT DETERMINES A SIZE OF METADATA-BASED SYSTEM SNAPSHOTS

(71) Applicant: EMC IP Holding Company LLC, Hopkinton, MA (US)

(72) Inventors: Mikhail Danilov, Saint Petersburg (RU); Kirill Gusakov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 132 days.

(21) Appl. No.: 16/231,051

(22) Filed: Dec. 21, 2018

(65) Prior Publication Data
US 2020/0201814 A1    Jun. 25, 2020

(51) Int. Cl.
| | |
|---|---|
| *G06F 16/11* | (2019.01) |
| *G06F 16/17* | (2019.01) |
| *G06F 17/10* | (2006.01) |
| *G06F 16/901* | (2019.01) |

(52) U.S. Cl.
CPC ......... *G06F 16/128* (2019.01); *G06F 16/122* (2019.01); *G06F 16/1734* (2019.01); *G06F 16/9027* (2019.01); *G06F 17/10* (2013.01)

(58) Field of Classification Search
CPC .. G06F 16/128; G06F 16/122; G06F 16/9027; G06F 16/1734; G06F 17/10
See application file for complete search history.

(56) References Cited

U.S. PATENT DOCUMENTS

| | | | |
|---|---|---|---|
| 9,176,871 B1 | 11/2015 | Serlet | |
| 10,616,101 B1 * | 4/2020 | Peterson | H04L 47/2483 |
| 2004/0024826 A1 * | 2/2004 | Halahmi | H04L 51/04 709/206 |
| 2008/0071841 A1 * | 3/2008 | Okada | G06F 11/1471 |
| 2013/0332660 A1 | 12/2013 | Talagala et al. | |
| 2015/0067283 A1 * | 3/2015 | Basu | G06F 3/0641 711/162 |
| 2016/0292178 A1 | 10/2016 | Manville et al. | |
| 2016/0328301 A1 * | 11/2016 | Parakh | G06F 11/1451 |
| 2018/0121454 A1 * | 5/2018 | Kushwah | G06F 16/13 |
| 2018/0267985 A1 * | 9/2018 | Badey | G06F 16/184 |

OTHER PUBLICATIONS

Office Action dated Apr. 29, 2020 for U.S. Appl. No. 16/047,639, 23 pages.

* cited by examiner

*Primary Examiner* — Ashish Thomas
*Assistant Examiner* — Dustin D Eyers
(74) *Attorney, Agent, or Firm* — Amin, Turocy & Watson, LLP

(57) ABSTRACT

A size of a metadata-based system snapshot is determined based on performing incremental calculations in background mode to assure accurate size reporting without producing considerable workload. Snapshot sizes are relative to each other. For example, a size of a first snapshot is set when a second snapshot is generated. Moreover, a size of the latest snapshot is relative to a current tree version and a size of an older snapshot is relative to a snapshot that follows it. An aggregated size of all system snapshots can be determined by adding the individual snapshot sizes. This provides simplicity during snapshot management.

20 Claims, 11 Drawing Sheets

SYSTEM AND METHOD THAT DETERMINES A SIZE OF METADATA-BASED SYSTEM SNAPSHOTS

TECHNICAL FIELD

The subject disclosure generally relates to embodiments for a system and method that determines a size of metadata-based system snapshots.

BACKGROUND

Conventional storage technologies that use metadata-based search trees for storage operations are susceptible to data loss when roots of corresponding search trees are lost or corrupted. Further, recovery from erroneous deletion of data is difficult to perform as such recovery is a manual procedure, and data to be recovered can be referenced from different search trees and stored across different storage blocks.

Although conventional storage technologies have tried to mitigate data loss by storing obsolete roots of metadata-based trees for week(s), disparate trees that have been updated independently may not be able to consistently represent a state of a system at a particular age of the system. Consequently, conventional storage technologies have had some drawbacks, some of which may be noted with reference to the various embodiments described herein below.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods, and other embodiments, disclosed herein relate to facilitating efficient snapshot management. In one example embodiment, a system is disclosed that comprises a processor and a memory that stores executable instructions that, when executed by the processor, facilitate performance of operations. Moreover, the operations comprise generating, at a first time, a first snapshot of first roots of respective object table trees of a storage system, wherein the respective object table trees comprise metadata representing respective states of the storage system at the first time. Further, the operations comprise incrementally increasing a cached size value based on journal data that references data updates associated with the object table trees. Furthermore, the operations comprise in response to determining that a second snapshot of second roots of the respective object table trees has been generated at a second time, determining size data indicative of a size of the first snapshot based on the cached size value at the second time.

Another example embodiment of the specification relates to a method that comprises during a first time period, generating, by a system comprising a processor, first snapshot data indicative of a first snapshot of first roots of respective object table trees of a storage system, wherein the respective object table trees comprise metadata representing respective states of the storage system during the first time period. The method further comprises storing a cached size value associated with the first snapshot data; based on journal data that references data updates associated with the object table trees, incrementally increasing the cached size value; and in response to determining that a second snapshot of second roots of the respective object table trees has been generated during a second time period, assigning, as a size of the first snapshot, the cached size value during the second time period.

Another example embodiment of the specification relates to a computer-readable storage medium comprising instructions that, in response to execution, cause a computing node device comprising a processor to perform operations, comprising during a first time period, generating, first snapshot data indicative of a first snapshot of first roots of respective object table trees of a storage system, wherein the respective object table trees comprise metadata representing respective states of the storage system during the first time period; storing a cached size value associated with the first snapshot data; based on journal data that references data updates associated with the object table trees, incrementally increasing the cached size value; and in response to determining that a second snapshot of second roots of the respective object table trees has been generated during a second time period, assigning, as a size of the first snapshot, the cached size value during the second time period.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
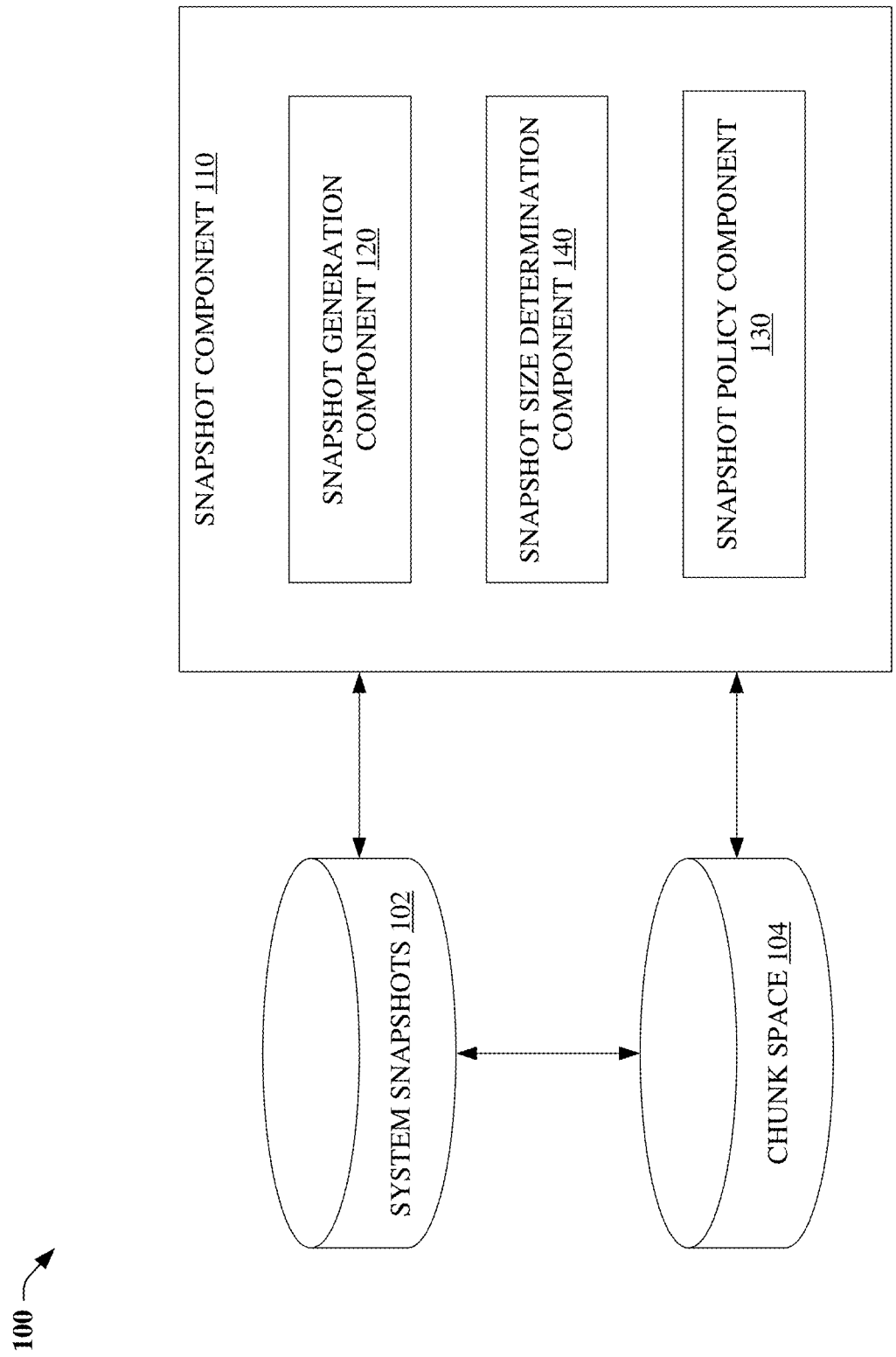
FIG. 1 illustrates an example system that facilitates improved system recovery via metadata-based snapshots based on a state of user data of a storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used herein, the term "cloud" can refer to a cluster, data storage cluster, etc. comprising a group of nodes, storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can include multiple layers, aggregated together, which interact with each other to provide resources for end-users.

Example systems and methods disclosed herein, in one or more embodiments, relate to cloud storage systems that utilize erasure coding for data protection, such as, but not limited to an ECS™ platform. The ECS™ platform combines the cost advantages of commodity infrastructure with the reliability, availability, and serviceability of traditional arrays. In one aspect, the ECS™ platform can comprise a cluster of nodes (also referred to as "cluster" herein) that delivers scalable and simple public cloud services with the reliability and/or control of a private-cloud infrastructure. Moreover, the ECS™ platform comprises a scale-out, cluster-based, shared-nothing object storage, which employs a microservices architecture pattern. The ECS™ platform can support storage, manipulation, and/or analysis of unstructured data on a massive scale on commodity hardware. As an example, ECS™ can support mobile, cloud, big data, content-sharing, and/or social networking applications. ECS™ can be deployed as a turnkey storage appliance or as a software product that can be installed on a set of qualified commodity servers and/or disks. The ECS™ scale-out and geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In an aspect, ECS™ does not rely on a file system for disk capacity management. Instead, ECS™ partitions disk space into a set of blocks of fixed size called chunks (e.g., having a chunk size of 128 MB). All user data is stored in these chunks and the chunks are shared. Typically, a chunk can comprise fragments of several different user objects. The chunk content can be modified in an append-only mode. When a chunk becomes full, it can be sealed, and the content of a sealed chunk is immutable. There are different types of chunks, one type per capacity user. For example, user data is stored in repository (repo) chunks, xB+ trees are stored in tree chunks, and tree journals are stored in journal chunks, etc. Further, ECS™ does not use traditional databases to store metadata and system data. Instead, it uses a search tree implementation to store it; for example, ECS implements its own version of a B+ tree data structure.

As described above, conventional storage technologies have had some drawbacks with respect to recovering data using metadata-based search trees. For example, such recovery is time consuming as it requires manual iteration across different search trees until an applicable search tree combination representing lost data can be found. Further, consistent representation, via the applicable search tree combination, of a state of a system corresponding to a particular time can be difficult or impossible as data to be recovered can be stored across different storage blocks that have been referenced by disparate search trees that have been independently updated by different processes. In contrast, various embodiments disclosed herein can improve data recovery by synchronizing metadata-based system snapshots (also referred to herein as "snapshots") with a state of user data. For example, automated, consistent recovery of a system state can be facilitated by synchronizing snapshots of metadata representing respective system states with a state of user data, e.g., by preserving a live/active object during a garbage collection (GC) process until the live/active object has been referenced by snapshot(s) of the system. In particular, systems and methods disclosed herein facilitate efficient snapshot management based on performing incremental calculations in a background mode to assure accurate size reporting without producing considerable workload. According to embodiment(s), the total snapshot size (e.g., of all system snapshots) can be calculated and utilized to create one or more efficient snapshot policies that can describe a lifecycle of the system snapshots.

Although the systems and methods disclosed herein have been described with respect to object storage systems (e.g., ECS™), it is noted that the subject specification is not limited to object storage systems and can be utilized for most any storage systems that utilize chunks for disk capacity management. Thus, any of the embodiments, aspects, concepts, structures, functionalities or examples described herein are non-limiting, and the technology may be used in various ways that provide benefits and advantages in computing and data storage in general.

Referring initially to FIG. 1, there illustrated is an example storage system 100 that facilitates improved system recovery via metadata-based snapshots based on a state of user data of the storage system, in accordance with various example embodiments. In this regard, the storage system 100 can comprise an object storage system, e.g., a file system, comprising, but not limited to comprising, a Dell EMC® Isilon file storage system (e.g., described in detail with regards to FIG. 9), e.g., an ECS™ system (also known as elastic cloud storage) system. In other embodiment(s), the storage system 100 can comprise a host server, a client server, etc. In yet other embodiment(s), various components of the storage system 100 can be included in a host application, a client application, etc. The ECS system can support storage, manipulation, and/or analysis of unstructured data on a massive scale on commodity hardware. As an example, the ECS system can support mobile, cloud, big data, and/or social networking applications. In another example, the ECS system can be deployed as a turnkey storage appliance, or as a software product that can be installed on a set of qualified commodity servers and disks, e.g., within a node, data storage node, etc. of a cluster, data storage cluster, etc. In this regard, the ECS system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), a storage system 100 can write all object-related data, e.g., user data, metadata, object location data, etc. to logical containers of contiguous disk space, e.g., such containers comprising a group of blocks of fixed size (e.g., 128 MB) known as chunks. In this regard, user data is stored in repository (or repo) chunks (e.g., included in chunk space 104). The repo chunks can be shared, e.g., one chunk can comprise data fragments of different user objects. Further, B+ trees (described below) are stored in tree chunks, and tree journals (described below) are stored in journal chunks. Furthermore, chunk content is modified in append-only mode, e.g., such content being protected from being erased or overwritten for a specified retention period. When a chunk becomes full enough, it is sealed and/or closed—becoming immutable, e.g., read-only and delete only.

Figure 2:
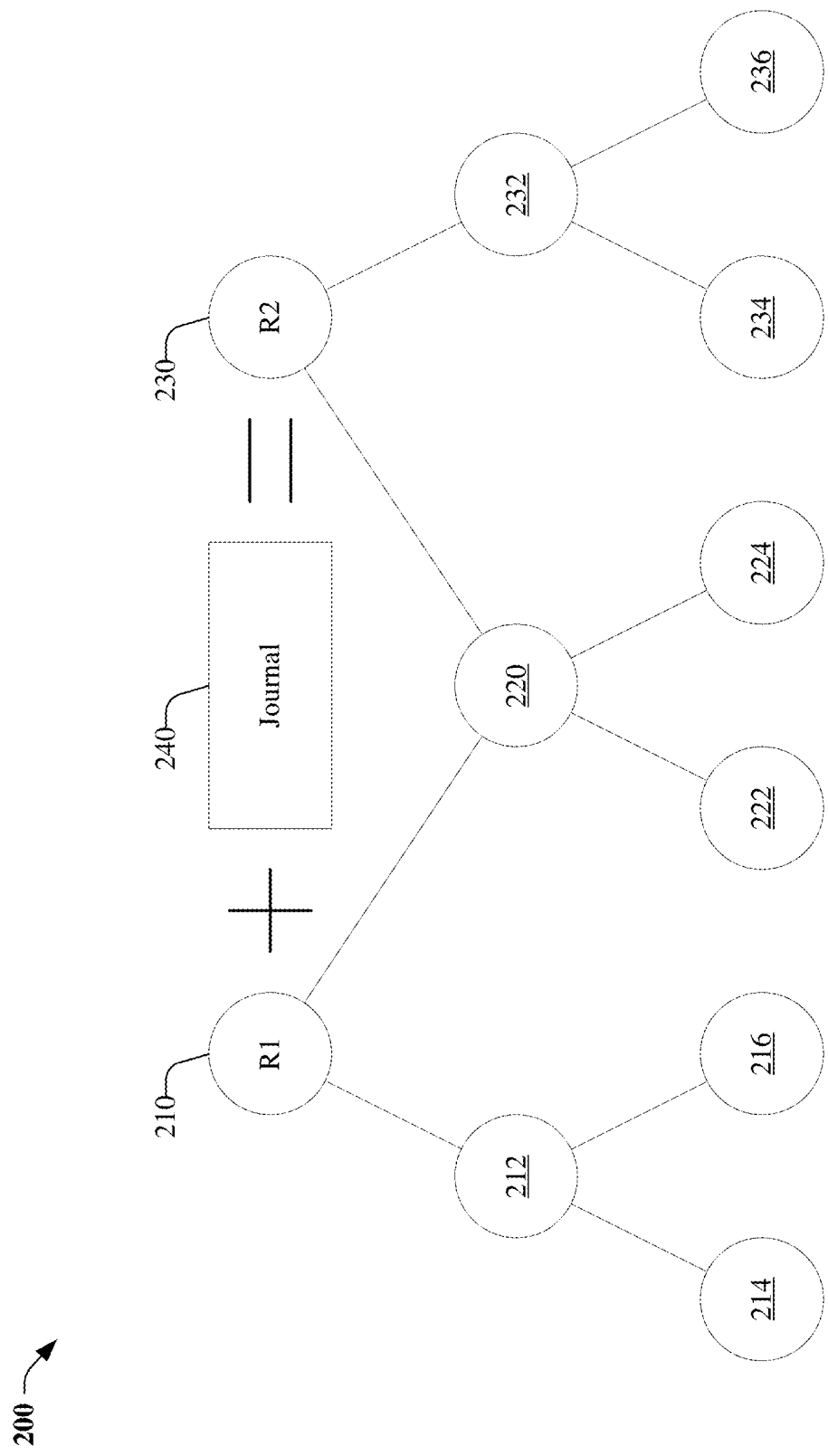
FIG. 2 illustrates an example data structure comprising metadata to describe a state of the storage system.

Referring now to FIG. 2, there illustrated is an example data structure 200, for example, B+ trees, or search trees, comprising metadata to describe a state of the storage system 100 including a state of user data, or objects (not shown), that have been stored in respective user data, e.g., repo, chunks (not shown), of chunk space 104. In this regard, a B+ tree (e.g., 210, 230) comprises a root ("R1", "R2", etc.), internal nodes (e.g., 212, 220, 232), and leaves (e.g., 214, 216, 222, 224, 234, 236, etc.) that are stored in a tree chunk (not shown). For example, the storage system 100 uses an object data structure, for example, an object table (OT), comprising a B+ tree to describe respective chunk locations of all user data, objects, repo chunks, etc. in storage system 100, e.g., within chunk space 104.

Each B+ tree has a tree journal, or journal, referencing data updates associated with the B+ tree. In this regard, FIG. 2 illustrates a search tree 210 that has been updated, e.g., via addition of root R2 of a new search tree 230, and a journal 240 comprising records representing update(s) that have been made to the search tree, e.g., to facilitate recovery of a state of the storage system affected by the update. The storage system 100 can utilize a chunk table comprising a B+ tree to describe respective physical locations, e.g., clusters, nodes, disks, sectors, offsets, etc. of respective repo chunks within the storage system 100.

Further, immutability (see above) of data chunks also means that all tree elements are immutable. Each tree update incurs a reallocation of at least N pages, where N is a current depth of the tree. In particular, a root of a tree changes after each update of the tree and updating a tree journal is an expensive operation with respect to use of processing resources. As such, a tree journal of a tree is not updated after a single data update of the tree. In this regard, when a journal becomes full, e.g., references a defined amount of tree updates, does not have tree chunk(s) available to reference further changes of a corresponding tree, etc. a journal process implements a bulk tree update in order to minimize a total cost of updating the tree. The bulk tree update results in creation of a new tree because a root of a tree changes when the tree has been modified. In many cases, an old tree and new tree (also referred to herein as tree versions) share elements, e.g., nodes, leaves, etc. For example, tree 210 and tree 230 share a sub-tree comprising node 220 and leaves 222 and 224.

It should be appreciated that in various embodiments disclosed herein with respect to performing a snapshot (e.g., comprising a point-in-time copy, via metadata of respective search trees, of a state of the storage system (e.g., representing respective states of object-related data, e.g., user data, metadata, object location data, etc.)), object-related data is assumed to be immutable during performance of snapshot operation(s). Further, it should be appreciated that system snapshots 102 and chunk space 104 can comprise physical storage device(s), virtual storage device(s), hard disk drive(s), cloud-based storage device(s), etc.

Referring again to FIG. 1, a plurality of system trees (not shown) that have been stored in the system snapshots 102 describe a current system state of system 100 including a state of user data. In this regard, a snapshot generation component 120 can generate, at respective times (e.g., periodically, in response to detection of a defined event, etc.), snapshots of roots of respective trees of the storage system—the respective trees comprising metadata representing respective states of the storage system corresponding, via the snapshots of the roots of the respective trees, to the respective times; and the snapshots recording respective states of the storage system to facilitate data recovery. For example, after a failure of the storage system, e.g., which has been caused by corruption of the root of the tree of the storage system and/or accidental deletion by a client, the tree can be recovered using a most recent snapshot of the storage system 100. In the event such recovery fails, the tree can be recovered using a next recent snapshot, and so on. As such, the journals can be iteratively utilized to "re-play", recover, etc. respective states of the storage system 100.

In embodiment(s), the snapshot generation component 120 can perform a snapshot of the roots as an instant, atomic, all at once, grouped root, etc. operation to assure consistency of a system state described by the snapshot. In other embodiment(s), the snapshot generation component 120 can periodically, e.g., every 24 hours, create snapshots of the storage system. In yet other embodiment(s), the snapshot generation component 120 can perform a snapshot of the roots in response to detection of a defined event, e.g., upon detection of an update that has been performed on software and/or hardware components of the storage system.

Data must remain restorable, which means that live/active objects that are accessible, e.g., can be read, written, updated, etc. via client device(s), should not be subject to a garbage collection (GC) process. Garbage collection in the ECS system works at the chunk level, and respective GC processes are performed for each chunk type. Further, the respective GC processes scan trees to detect unused chunks, e.g., chunks not being occupied by live/active objects. For example, a GC process for repo chunks can scan an object table (OT) to detect repo chunks that are not occupied by live/active objects. As each system snapshot includes a corresponding OT version, the garbage collection component can facilitate production, via the snapshot component 110, of consistent snapshots of the storage system by synchronizing the snapshots with a state of user data, e.g., by excluding older live/active user data from being deleted via the GC process.

According to an embodiment, a snapshot policy component can be utilized to define desired lifecycle for the system snapshots 102. As an example, the policy can define when the snapshot generation component 120 can generate a snapshot and specify for how long the snapshot can be stored (e.g., generate snapshots every 24 hours and keep them for 2 weeks). Typically, such a policy is always a trade-off between capacity use efficiency and data availability. To improve the snapshot policy, information about snapshots' sizes (e.g., capacity overheads associated with snapshots) can be determined, for example, by employing the snapshot size determination component 140. A size of a snapshot can comprise a total size of all removed user data, for which capacity cannot be reclaimed because the data is still referenced from the snapshot.

A straightforward approach to calculate a size of a given snapshot can comprise comparing a current/latest version of an OT's snapshot with an older version of the OT's snapshot to detect all user data that is referenced from the older version but not referenced from the current version and then calculate the total size of such user data. However, this straightforward approach is extremely resource intensive and accordingly, not practical. Additionally, a snapshot size can grow so there may be a need to repeat the expensive operation of comparison of two trees several times as the size grows.

To overcome the above noted technical problems, the snapshot size determination component 140 can employ an incremental approach to calculate a size of a latest/freshest snapshot (e.g., whose size can grow), wherein a size of a previous snapshot is fixed when/after another snapshot is taken. Accordingly, snapshot sizes are relative. For example, a size of the latest snapshot is relative to the current tree version and a size of an older snapshot is relative to a snapshot that follows it. This approach assures simplicity of snapshot management. It is noted that snapshots can be deleted starting with the oldest one. Further, in an aspect, the snapshot size determination component 140 can determine a total size of all system snapshots based on adding the individual snapshot sizes. The total size can increase with each operation described with a record associated with a data removal operation. Further, the total size can decrease when an old snapshot is deleted. This allows the snapshot policy component 130 to define and implement a simple capacity-based snapshot policy. For example, a system administrator can reserve 5% of total storage capacity or 100 TB of storage capacity for system snapshots. When total size of system snapshots exceeds the capacity limit, the snapshot policy component 130 can trigger deletion of one or several oldest snapshots until the total size is once again within the limit.

Figure 3:
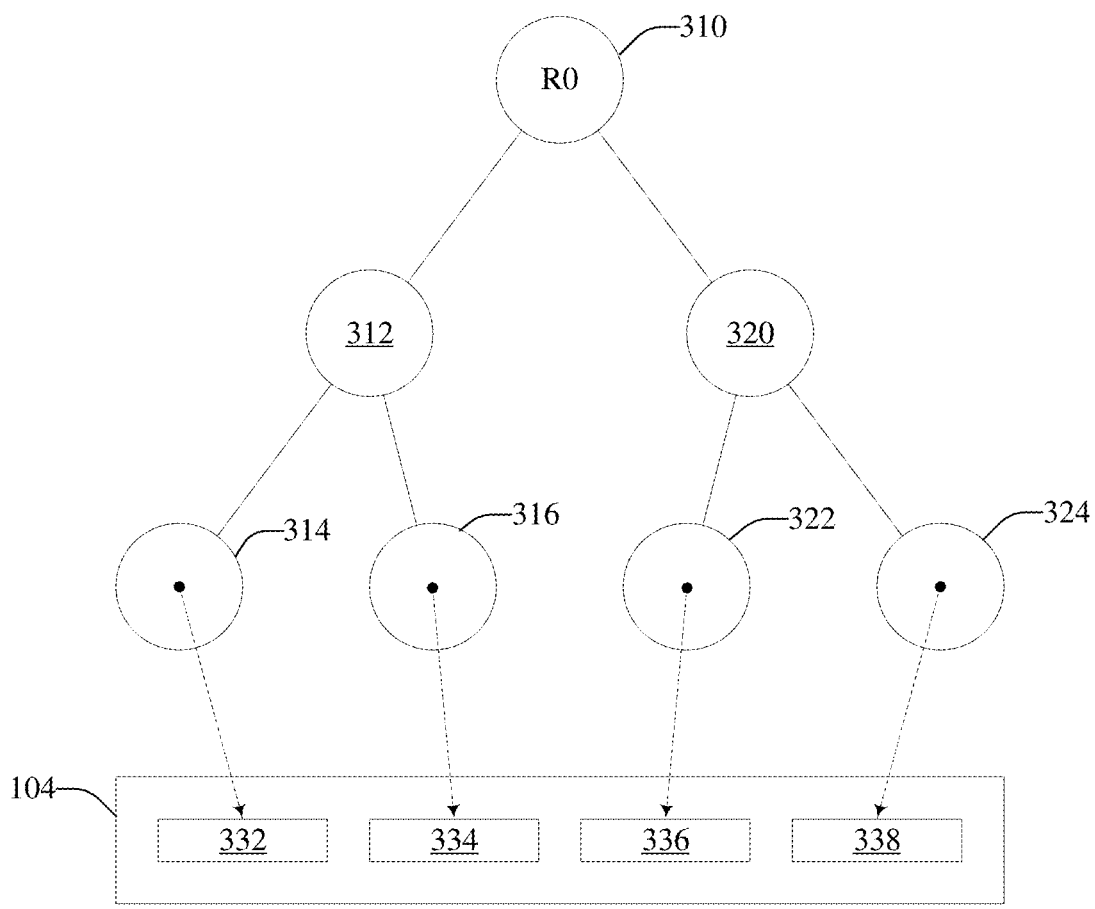
FIG. 3 illustrates an example snapshot that represents an initial state of the storage system, in accordance with various example embodiments.

FIG. 3 illustrates an example snapshot ("S0") that represents an initial state of a storage system (e.g., storage system 100), in accordance with various example embodiments. Snapshot S0 comprises root "R0" of tree 310, which comprises nodes (312, 320) that comprise keys. The nodes are connected to leaves (314, 316, 322, and 324), which comprise key/value pairs referencing respective chunks (332, 334, 336, 338) in the chunk space (104).

Figure 4:
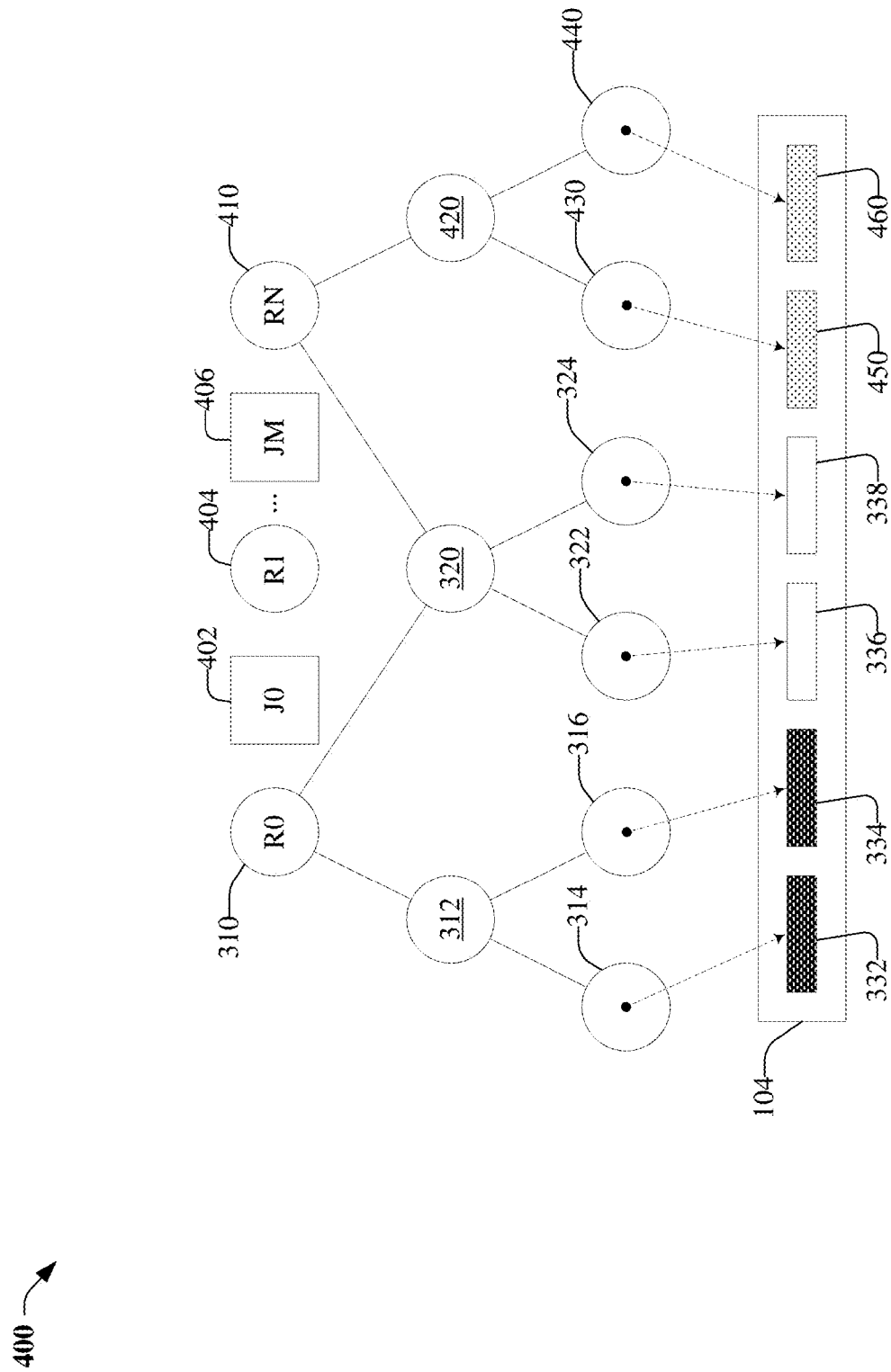
FIG. 4 illustrates an example journals that represent updates that have been made to the storage system, in accordance with various example embodiments.

FIG. 4 illustrates several updates that have been made to the storage system, represented by journals "J0" (402) to "JM" (406). In this regard, a new tree version (410) with root "RN" was created to reference, via node 420 and leaves 430 and 440, new data chunks 450 and 460 that were created in the chunk space. Old data (332 and 334) was deleted. In this example scenario, if root RN becomes lost/corrupt, which results in objects referenced by root RN (450, 460) becoming unavailable, the most recent snapshot (S0), along with journals J0 to JM can be utilized to "re-play" updates that had been made to the storage system after the most recent snapshot to recover a system state of the storage system.

Figure 5:
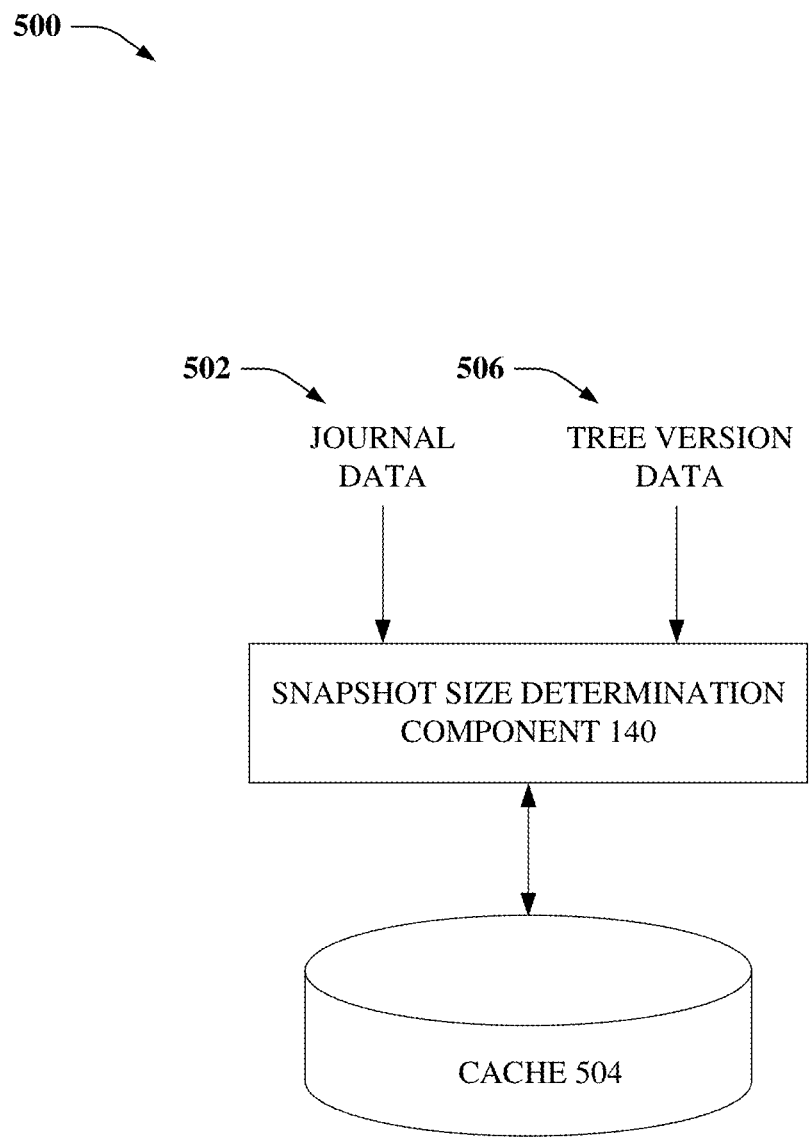
FIG. 5 illustrates an example system that facilitates management of metadata-based snapshots of the storage system.

FIG. 5 illustrates an example system 500 that facilitates management of metadata-based snapshots of the storage system in accordance with an aspect of the specification. It is noted that the snapshot size determination component 140 can include functionality as more fully described herein, for example, as described above with regard to system 100.

User data in ECS is referenced by an OT and an OT journal, which is an ordered stream of records and is the feed for the OT. A OT journal can comprise various types of records, for example, associated with different operations that have been performed on the user data objects (e.g., create an object, delete an object, update an object, update metadata for an object, etc). Journal records that describe data removal (e.g., delete operation, update operation) are referred to as minus records (-records). At least one removed data portion is associated with a minus record. In one aspect, the snapshot size determination component 140 can accumulate size of the removed data portions to determine the size of a snapshot.

Consider an example scenario wherein an initial/new snapshot is taken (e.g., by the snapshot generation component 120). An initial size of the snapshot can be set as zero. According to an embodiment, the snapshot size determination component 140 can analyze journal data 502 to track one or more OT journals starting with the first record, which is not in the snapshot trees. In particular, the snapshot size determination component 140 can detect minus records, determine a size of each minus record, and add the size to the total snapshot size. Thus, the size of the snapshot grows with each minus record.

In some example scenarios, when another snapshot is taken (e.g., by the snapshot generation component 120), the tree that the snapshot is based on, can be a little behind the current system state because of not yet being incorporated to the tree journal records. In order to take into account this effect and provide exact snapshot sizes, the snapshot size determination component 140 can cache (e.g., within cache 504) the value of the current snapshot size in response to determining (e.g., based on the tree version data 506) that a new tree version has been created. When the next system snapshot is taken (e.g., by the snapshot generation component 120), the currently cached value is set as the size of the previous snapshot. This cached value reflects "the distance" between the two tree versions, the versions, which are parts of the new snapshot and the previous one. The process starts over for a fresh system snapshot.

Total size of all system snapshots comprises a sum of snapshot sizes. The total size increases with each operation described with a minus record and decreases when an oldest snapshot is deleted. This allows to define a simple capacity-based snapshot policy (e.g., reserving a percentage of total storage capacity or a variable/fixed value for storing system snapshots). Based on the defined policy, the system can delete one or more old snapshots in response to determining that the total size of system snapshots has exceeded a capacity limit. Although the above embodiments for snapshot management have been described with respect to one OT tree, it is noted that the subject specification is not limited to a single OT tree and aspects disclosed herein can be applied to multiple OT trees.

Figure 6:
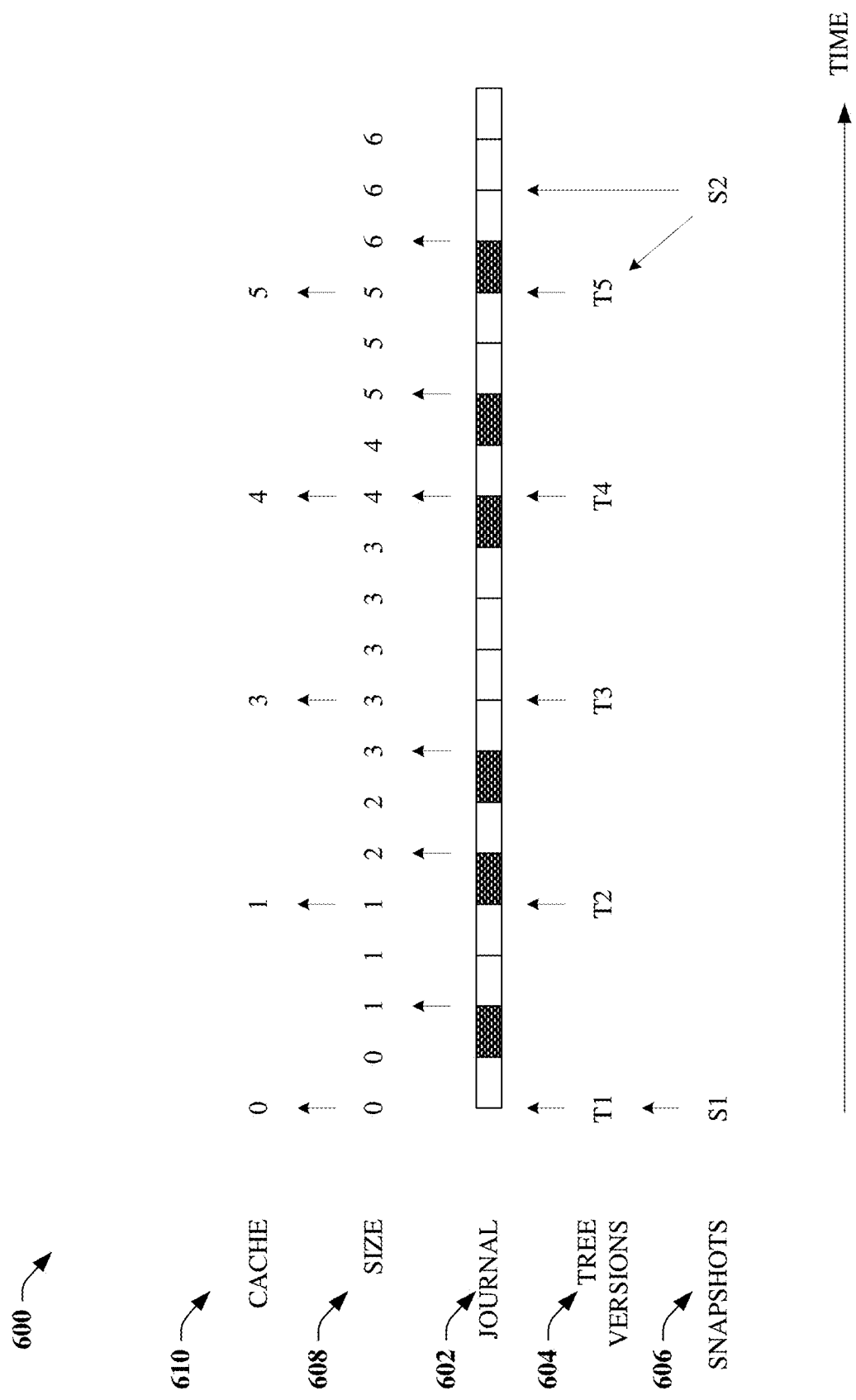
FIG. 6 illustrates an example timeline that depicts a synchronization between journal, trees, and snapshots of the storage system.

FIG. 6 illustrates an example timeline 600 that depicts a synchronization between journal, trees, and snapshots of the storage system, according to an aspect of the subject disclosure. Journal 602 comprises a stream of records that reference data updates associated with an OT tree. As an example, the stream of records comprises minus records (represented as dark shaded blocks) and other records (represented as white blocks). New tree versions 604 can be created over time, for example, at times T1, T2, T3, T4, and T5. Each tree version points to a first journal record, which is not yet in the tree. Snapshots 606 can be generated (e.g., by the snapshot generation component 120) to facilitate data recovery. As an example, snapshot S1 is based on tree T1 and the tree fully describes the snapshot. The size 608 illustrates how the size of snapshot S1 changes over time. According to an embodiment, the size is incremented (e.g., by the snapshot size determination component 140) with each processed minus record. It is noted that for the sake of simplicity all data portions in this example have size 1, but the subject specification is not so limited, and the data portions can have the same or different sizes. The size 608 can be cached (e.g., stored within cache 504) in response to a new tree version being generated. In other words, the cache 610 can be updated for each new tree version. The final size of the snapshot S1 can be determined from cache 610 when the next snapshot, S2, is generated. For example, the size of the snapshot S1 can be determined as 5.

Snapshot S2 is generated after tree version T5 has been created. Although S2 is based on T5 there are a couple of journal records between S2 and T5, one of which is a minus record. The final size of S1 is only 5 since it is the cached value for tree version T5 and the remaining 1, caused by the last minus record (between T5 and S2) can be added to the size of snapshot S2 so the total size of all snapshots remains the same. Accordingly, the initial value of the size 608 for S2 can be set as 1 (6−5=1) and incremented as additional minus records are tracked. The total size of the all snapshots can be determined by summing the individual sizes cached at 610.

Figure 7A:
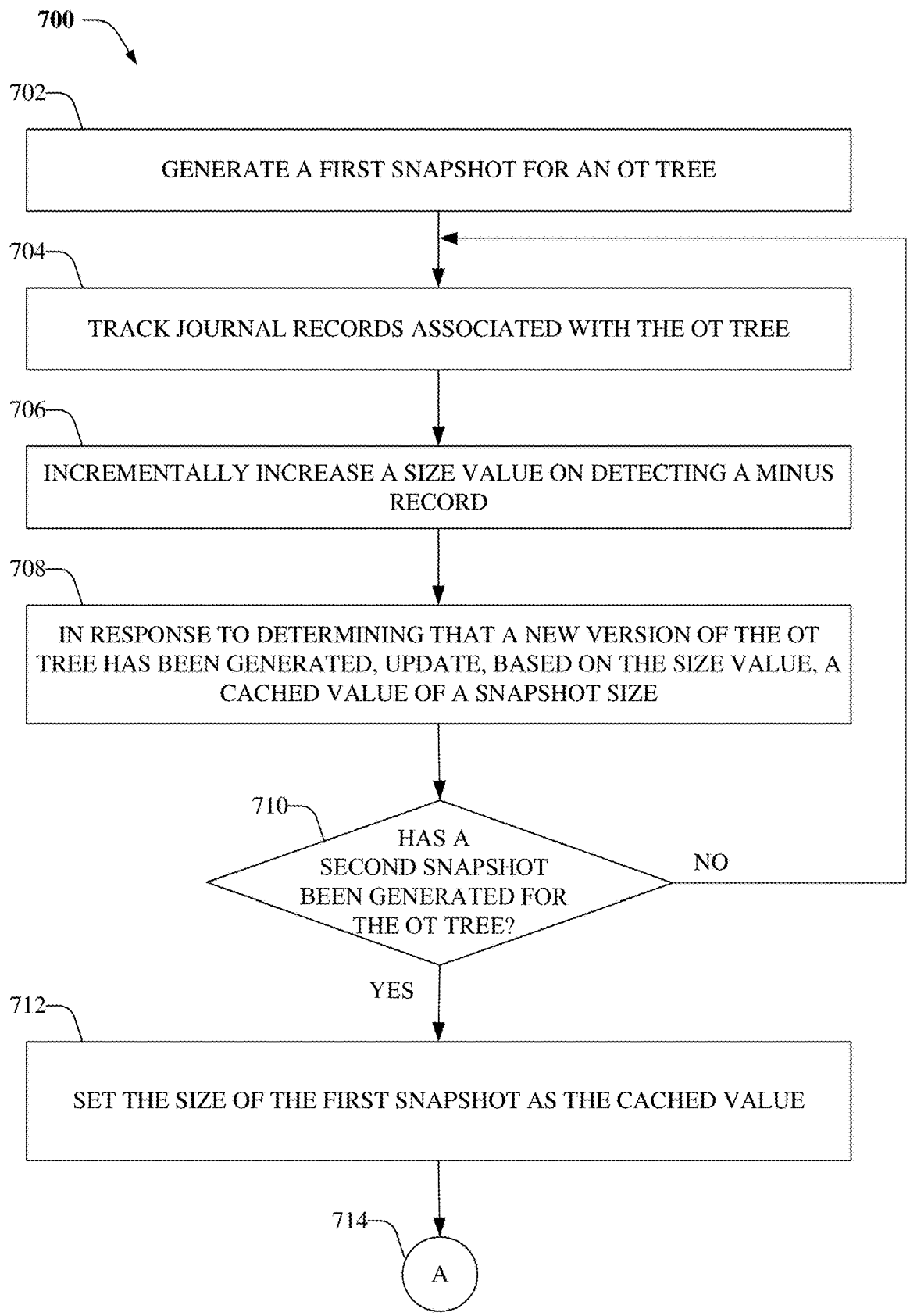
FIGS. 7A-7B illustrates example methods for determining a size of a snapshot in accordance with an aspect of the subject disclosure.
Figure 7B:
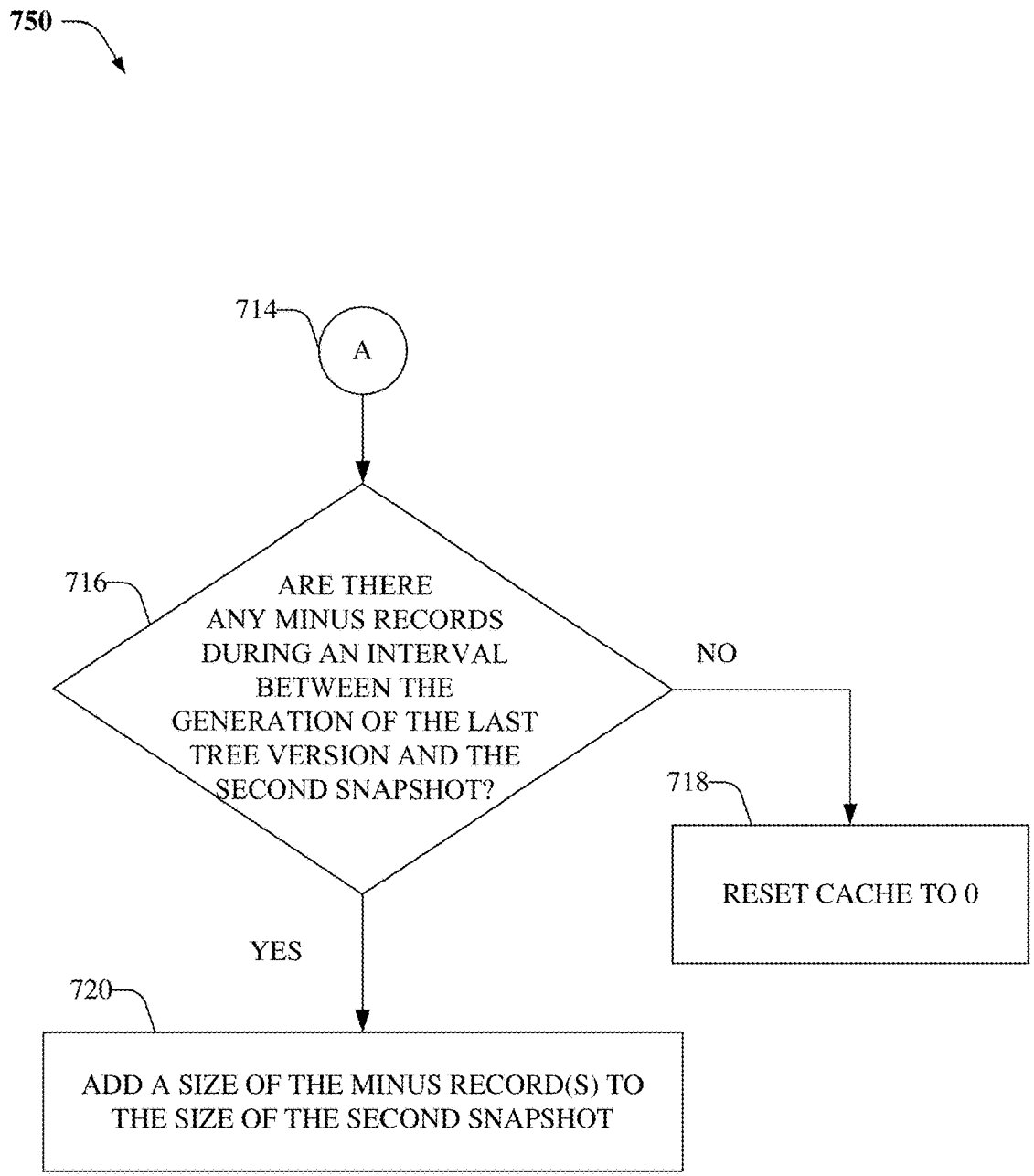
Figure 8:
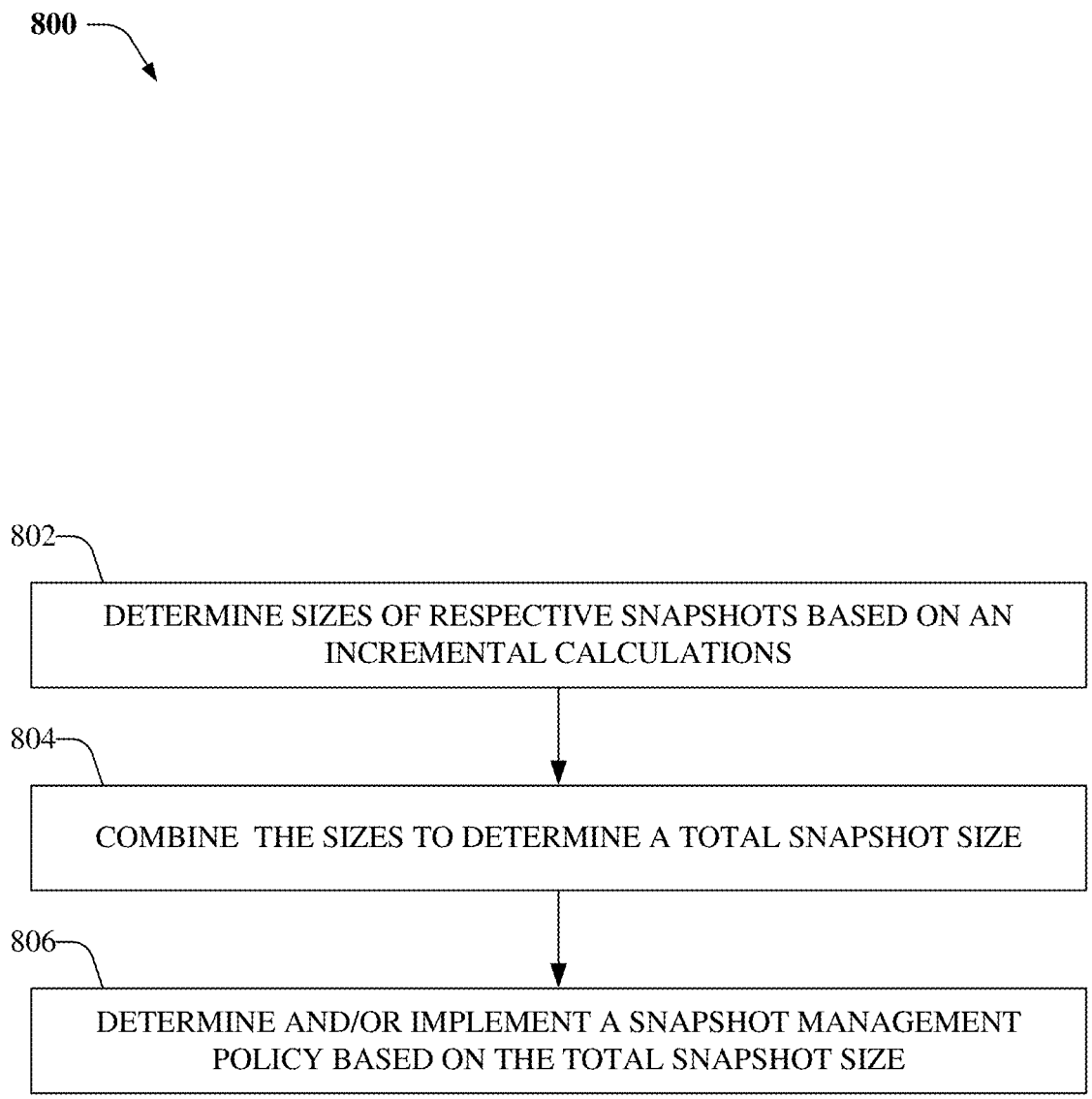
FIG. 8 illustrates an example method that facilitates efficient snapshot size management, according to an aspect of the subject disclosure.

FIGS. 7A, 7B, and 8 illustrates flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIGS. 7A-7B, there illustrated are example methods (700, 750) for determining a size of a snapshot in accordance with an aspect of the subject disclosure. In an aspect, the methods (700, 750) can be performed within an object storage system, for example, ECS™. The object storage system can employ chunks for disk capacity management, wherein the disk space is partitioned into a set of blocks of fixed/defined size (e.g., 128 MB) called chunks. User data is stored in repo chunks. The object storage system can comprise a tree, for example, an OT tree that keeps track of all user objects within the object storage system. Corruption of the OT can lead to substantial data loss and thus, to mitigate the risk of data loss, snapshots of the system can be generated periodically that can be utilized to recover the OT after a failure condition.

According to an aspect, at 702, a first snapshot can be generated for the OT tree. As an example, the first snapshot can comprise a point-in-time copy, via metadata of the OT tree, of a state of the storage system (e.g., representing respective states of object-related data, e.g., user data, metadata, object location data, etc.)). It is noted that object-related data is assumed to be immutable during performance of snapshot operation(s). Moreover, the snapshots disclosed herein can comprise snapshots of roots of respective trees of the storage system—the respective trees comprising metadata representing respective states of the storage system corresponding, via the snapshots of the roots of the respective trees, to the respective times; and the snapshots recording respective states of the storage system to facilitate data recovery.

In an aspect, the initial size of the first snapshot is set as zero. At 704, journal records associated with the OT tree can be tracked (e.g., starting with the first record, which is not in the snapshot trees). At 706, a size value can be incrementally increased on detecting a minus record (e.g., a record associated with data removal). For example, a size of each minus record can be calculated and added to the size value. Accordingly, the size value increases with each detected minus record. At 708, a cached valued of a snapshot size can be updated with the size value, in response to determining that a new version of the OT tree has been generated.

At 710, it can be determined whether a second snapshot has been generated for the OT tree. If not, the method continues to track journal records and repeats acts 704-708. Alternatively, if determined that the second snapshot has been generated for the OT tree, then at 712, the size of the first snapshot can be set as the cached value. Therefore, snapshot sizes are relative. The size of the latest snapshot is relative to the current tree version. A size of an older snapshot is relative to a snapshot that follows it. This approach assures simplicity of snapshot management. At 714, the method continues to FIG. 7B

In one aspect, at 716, it can be verified whether there are any minus records during an interval between the generation of the last tree version and the second snapshot. If not, at 718, the cache can be reset to zero and the methods (700, 750) can be repeated for the second (and subsequent) snapshots. Alternatively, if verified that one or more minus records are detected during the interval, then at 720, the size of the one or more minus records is added to the size of the second snapshot (e.g., the cache is set to the size of the one or more minus records). Further, the methods (700, 750) can be repeated for the second (and subsequent) snapshots.

FIG. 8 illustrates an example method 800 that facilitates efficient snapshot size management, according to an aspect of the subject disclosure. In an aspect, the method 800 can be performed within an object storage system, for example, ECS™. At 802, sizes of respective snapshots can be determined based on incremental calculations, for example, performed in background mode to assure accurate size reporting without producing considerable workload. At 804, the sizes can be combined (e.g., summed) to determine a total snapshot size. In an aspect, the total snapshot size comprises an aggregated size of all removed user data, for which capacity cannot be reclaimed because the user data is still referenced from the snapshot. Total size increases with each operation described with a minus record and decreases when a snapshot, or oldest snapshot, of the snapshots of the roots that is older than remaining snapshots of the snapshots of the roots, is deleted. At 806, a snapshot management policy can be determined and/or implemented based on the total snapshot size. For example, a capacity-based snapshot policy can be defined and/or implemented to limit the total size of the snapshots. For example, one or more oldest snapshots can be deleted until the total size of the snapshots is within a defined threshold.

Figure 9:
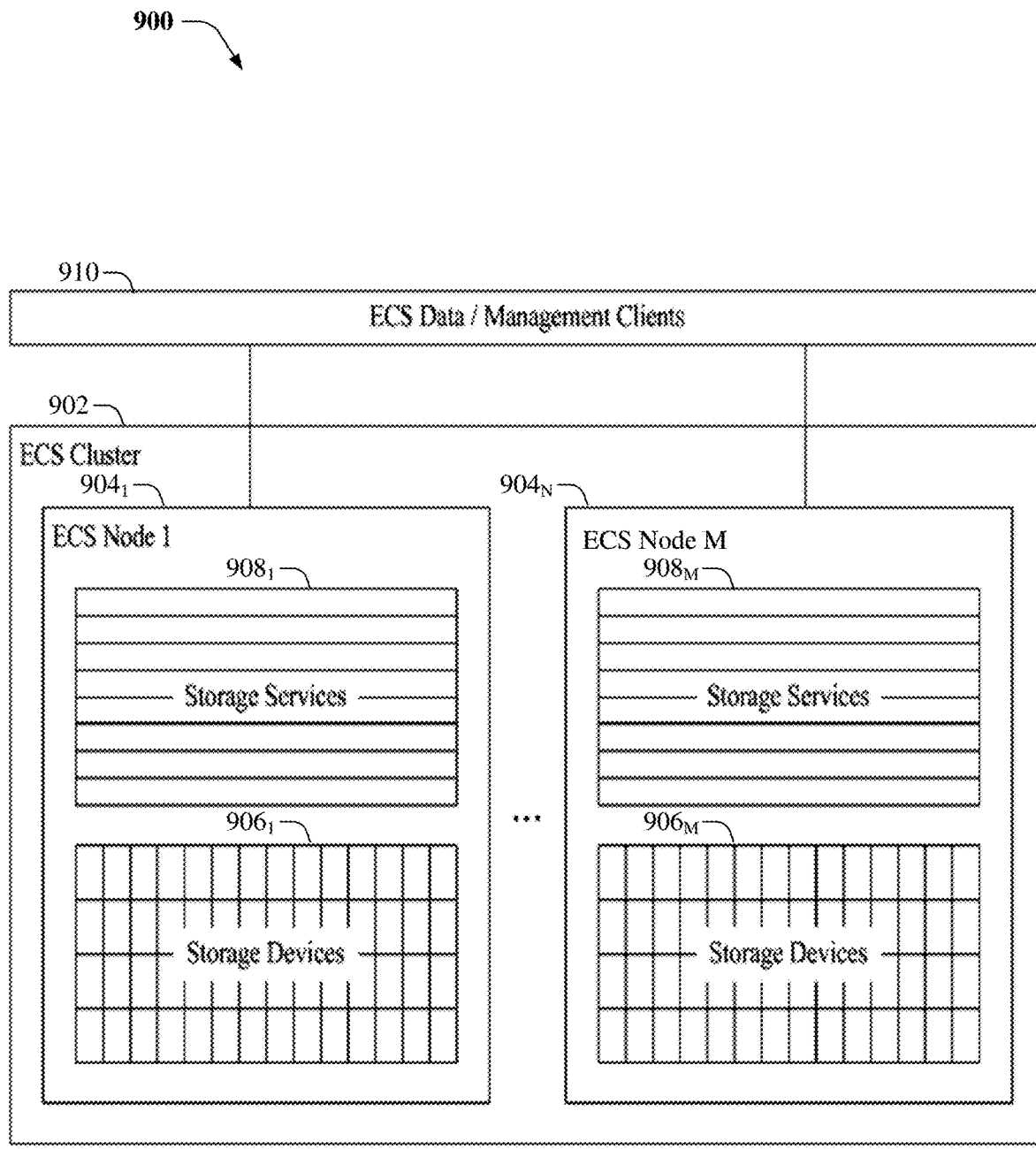
FIG. 9 illustrates a block diagram of an ECS system, in accordance with various example embodiments.

FIG. 9 illustrates an example high-level architecture 900 of an ECS™ cluster, according to an aspect of the subject disclosure. ECS™ can comprise a software-defined, cloud-scale, object storage platform that combines the cost advantages of commodity infrastructure with the reliability, availability and serviceability of traditional arrays. With ECS™, an organization can deliver scalable and simple public cloud services with the reliability and control of a private-cloud infrastructure. ECS™ provides comprehensive protocol support for unstructured (object and/or file) workloads on a single, cloud-scale storage platform. In an aspect, the ECS™ cluster 902 can comprise multiple nodes 904$_1$-904$_M$, wherein M is most any integer. The nodes 904$_1$-904$_M$ can comprise storage devices (e.g. hard drives) 906$_1$-906$_M$ and can run a set of services 908$_1$-908$_M$. For example, single node that runs ECS™ version 3.0 can manage 20 independent services. Further, ECS™ data/management clients 910 can be coupled to the nodes 904$_1$-904$_M$.

The ECS™ cluster 902 does not protect user data with traditional schemes like mirroring or parity protection. Instead, the ECS™ cluster 902 utilizes a k+m erasure coding protection scheme, wherein a data block (e.g., data chunk) is divided into k data fragments and m coding fragments are created (e.g., by encoding the k data fragments). Encoding is performed in a manner such that the ECS™ cluster 902 can tolerate the loss of any m fragments. As an example, the default scheme for ECS™ is 12+4, i.e. k equals to 12 and m equals to 4; however, the subject disclosure is not limited to this erasure coding protection scheme. When some fragments are lost, the missing fragments are restored via a decoding operation.

In one aspect, the storage services 908$_1$-908$_M$ can handle data availability and protection against data corruption, hardware failures, and/or data center disasters. As an example, the storage services 908$_1$-908$_M$ can comprise an unstructured storage engine (USE) (not shown), which is a distributed shared service that runs on each node 904$_1$-904$_M$ and manages transactions and persists data to nodes. The USE enables global namespace management across geographically dispersed data centers through geo-replication. In an aspect, the USE can write all object-related data (such as, user data, metadata, object location data) to logical containers of contiguous disk space known as chunks. Chunks are open and accepting writes or closed and not accepting writes. After chunks are closed, the USE can erasure-code them. The USE can write to chunks in an append-only pattern so that existing data is never overwritten or modified. This strategy improves performance because locking and cache validation is not required for I/O operations. All nodes 904$_1$-904$_M$ can process write requests for the same object simultaneously while writing to different chunks.

ECS™ continuously monitors the health of the nodes 904$_1$-904$_M$, their disks, and objects stored in the cluster. ECS™ disperses data protection responsibilities across the cluster, it can automatically re-protect at-risk objects when nodes or disks fail. When there is a failure of a node or drive in the site, the USE can identify the chunks and/or erasure coded fragments affected by the failure and can write copies of the affected chunks and/or erasure coded fragments to good nodes and disks that do not currently have copies.

Private and hybrid clouds greatly interest customers, who are facing ever-increasing amounts of data and storage costs, particularly in the public cloud space. ECS™ provides a scale-out and geo-distributed architecture that delivers an on-premise cloud platform that scales to exabytes of data with a TCO (Total Cost of Ownership) that's significantly less than public cloud storage. Further, ECS™ provides versatility, hyper-scalability, powerful features, and use of low-cost industry standard hardware.

Figure 10:
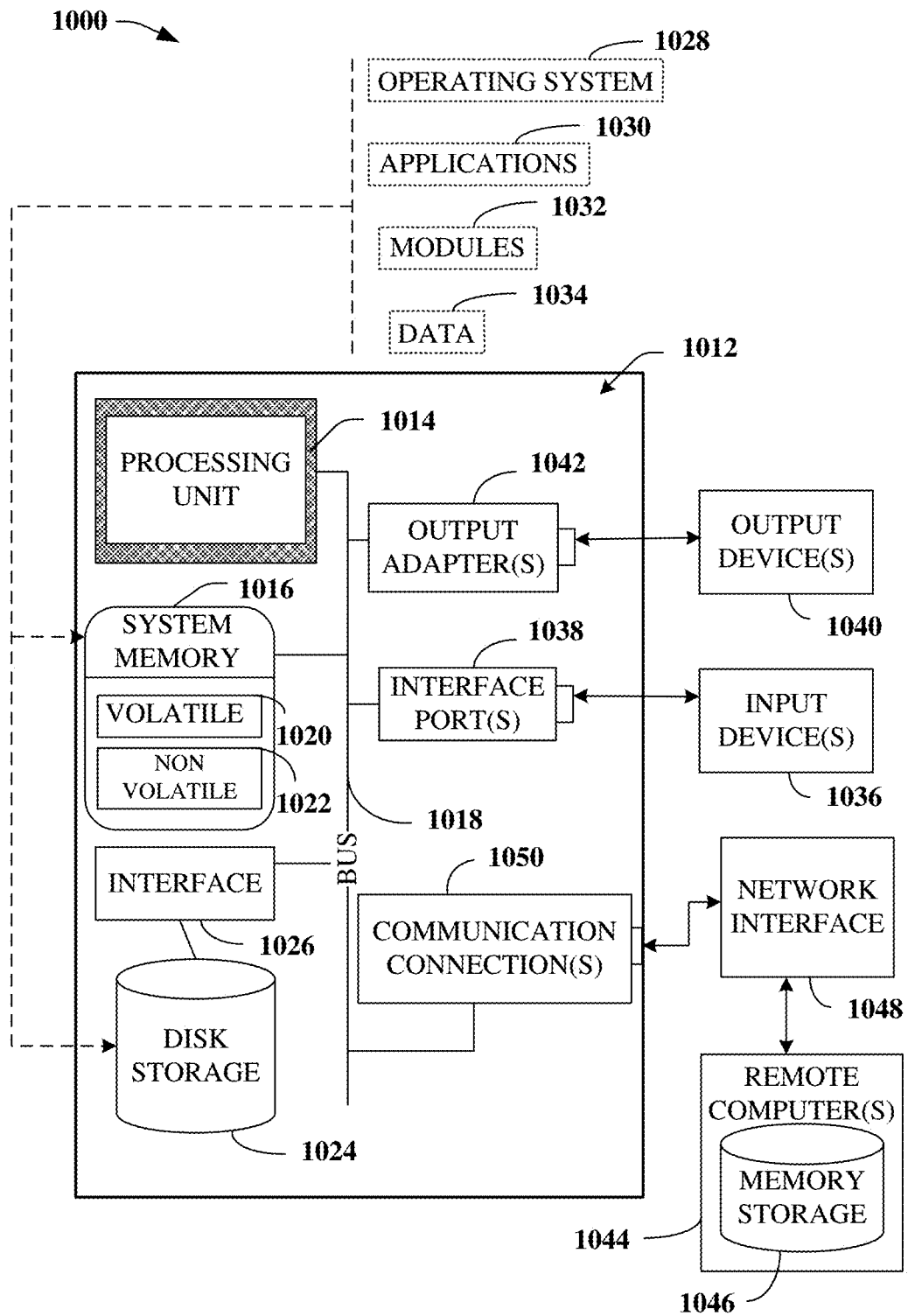
FIG. 10 illustrates a block diagram representing an illustrative non-limiting computing system or operating environ-

Referring now to FIG. 10, there is illustrated a block diagram of an example computer operable to execute data deletion with distributed erasure coding. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 10, a block diagram of a computing system 1000 operable to execute the disclosed systems and methods is illustrated, in accordance with an embodiment. Computer 1012 comprises a processing unit 1014, a system memory 1016, and a system bus 1018. As an example, the component(s), server(s), client(s), node(s), cluster(s), system(s), zone(s), module(s), agent(s), engine(s), manager(s), and/or device(s) disclosed herein with respect to systems 100-600 and 900 can each include at least a portion of the computing system 1000. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), comprising routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory.

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth®, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1000 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," "chunk space", "system snapshots", "storage medium", "cluster", "data storage cluster", "nodes", "storage nodes", "disk", "disk drive", "storage devices", and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components. Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        generating, at a first time, a first snapshot of first roots of respective object table trees of a storage system, wherein the respective object table trees comprise metadata representing respective states of the storage system at the first time;
        based on journal data that references data updates associated with the respective object table trees, incrementally increasing a cached size value representing a cache size of a cache of the system, wherein the cache size of the cache represents changes of a snapshot size of the first snapshot that have occurred over time, and wherein the incrementally increasing of the cached size value comprises
            between the first time and a second time that is after the first time, and in response to a first determination that the metadata represents that a data removal operation of a data object has been performed, incrementing the snapshot size of the first snapshot, and
            in response to a second determination that a new tree version of an object table tree of the respective object table trees has been created, storing a current value of the snapshot size of the first snapshot in the cache; and
        in response to determining that a second snapshot of second roots of the respective object table trees has been generated at the second time, determining size data indicative of the snapshot size of the first snapshot based on the cached size value representing the cache size of the cache at the second time.

2. The system of claim 1, wherein the operations further comprise:
    tracking the journal data that comprises a stream of records associated with the data updates.

3. The system of claim 2, wherein the records comprise at least one minus record associated with the data removal operation.

4. The system of claim 3, wherein the incrementally increasing comprises increasing the cached size value based on a size of the at least one minus record.

5. The system of claim 1, wherein the operations further comprise:
    determining total size data indicative of a total size of system snapshots based on adding the snapshot size of the first snapshot with sizes of other snapshots generated at other times.

6. The system of claim 5, wherein the operations further comprise:
    based on the total size data, defining policy data indicative of a policy associated with a lifecycle of the system snapshots.

7. The system of claim 1, wherein the operations further comprise:
    updating the cached size value in response to determining that a revised version of at least one of the respective object table trees has been generated.

8. The system of claim 1, wherein the operations further comprise:
    determining that there is at least one minus record created during an interval between a generation of a latest revised version of at least one of the respective object table trees and the second time, wherein the at least one minus record is a journal record associated with the data removal operation.

9. The system of claim 8, wherein the snapshot size is a first size and the operations further comprise:
    in response to the determining that there is the at least one minus record, adding, to a second size of the second snapshot, a third size of the minus record.

10. The system of claim 1, wherein the incrementally increasing comprises:
    incrementally increasing the cached size value via a background operation.

11. A method, comprising:
    during a first time period, generating, by a storage system comprising a processor, first snapshot data indicative of a first snapshot of first roots of respective object table trees of the storage system, wherein the respective object table trees comprise metadata representing respective states of the storage system during the first time period;
    storing, by the storage system, a cached size value representing a cache size of a cache, wherein the cache size represents changes of a snapshot size of the first snapshot that have occurred over the first time period;
    based on journal data that references data updates associated with the respective object table trees, incrementally increasing, by the storage system, the cached size value, the incrementally increasing comprising
        based on the journal data representing that a data removal operation has been performed on a data object, incrementing the snapshot size of the first snapshot, and
        in response to determining that a new tree version of an object table tree of the respective object table trees has been created, storing, as the cached size value, a present value of the snapshot size of the first snapshot in the cache; and
    in response to determining that a second snapshot of second roots of the respective object table trees has been generated during a second time period, determining, by the storage system, the snapshot size of the first snapshot based on the cached size value.

12. The method of claim 11, further comprising:
    subsequent to the determining of the snapshot size of the first snapshot, resetting, by the storage system, the cached size value.

13. The method of claim 11, further comprising:
monitoring, by the storage system, the journal data that comprises a stream of records associated with the data updates.

14. The method of claim 13, wherein the monitoring comprises determining a set of the records that are associated with the data removal operation.

15. The method of claim 14, wherein the incrementally increasing comprises increasing the cached size value based on a size of the set of the records.

16. The method of claim 11, further comprising:
determining, by the storage system, total size data indicative of a total size of system snapshots associated with the storage system based on aggregating the snapshot size of the first snapshot with sizes of disparate snapshots generated during disparate time periods.

17. The method of claim 16, further comprising:
based on the total size data, determining, by the storage system, policy data indicative of a policy associated with a lifecycle of the system snapshots.

18. A non-transitory computer-readable medium comprising instructions that, in response to execution, cause a server device comprising a processor to perform operations, comprising:
during a first time period, generating, first snapshot data representing a snapshot size of a first snapshot of first roots of respective object table trees of a storage system, wherein the respective object table trees comprise metadata representing respective states of the storage system during the first time period;
storing a cached size value representing a cache size of a cache, wherein the cache size represents changes of the snapshot size of the first snapshot;
based on journal data that references data updates associated with the respective object table trees,
storing a current snapshot size in the cache in response to a determination that a new tree version of an object table tree of the respective object table trees has been created, and
based on a data removal operation that has been performed by the storage system, on a data object, incrementally increasing the cached size value; and
in response to determining that a second snapshot of second roots of the respective object table trees has been generated during a second time period, determining the snapshot size of the first snapshot based on the cached size value.

19. The non-transitory computer-readable medium of claim 18, wherein the size is a first size, wherein the data removal operation is a first data removal operation, and wherein the operations further comprise:
in response to determining that there is at least one minus record created during an interval between a generation of a latest revised version of at least one of the respective object table trees and the second time period, adding, to a second size of the second snapshot, a third size of the at least one minus record, wherein the at least one minus record is a journal record associated with a second data removal operation.

20. The non-transitory computer-readable medium of claim 19, wherein the operations further comprise:
in response to determining that there is no minus record created during the interval, resetting the cached size value to zero.

* * * * *